Feb. 25, 1969 E. N. WRENSHALL 3,429,555
VALVE SUBJECTED TO EXTERIOR MOISTURE, AS AN
UNDERGROUND GAS DISTRIBUTION VALVE
Filed March 2, 1964
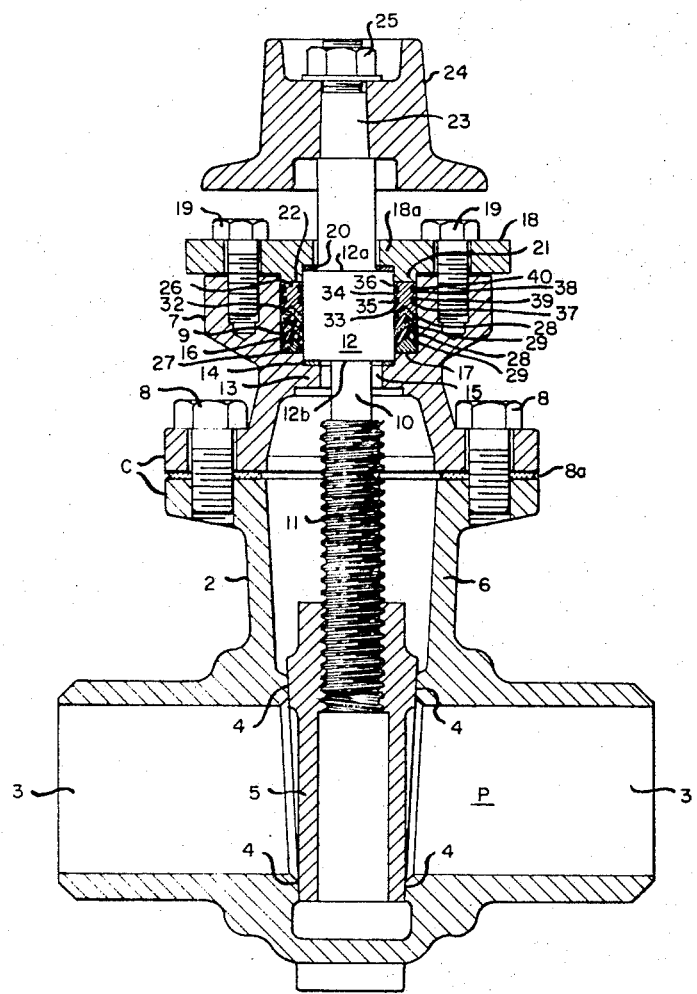
INVENTOR
Edward N. Wrenshall

United States Patent Office 3,429,555
Patented Feb. 25, 1969

3,429,555
VALVE SUBJECTED TO EXTERIOR MOISTURE, AS AN UNDERGROUND GAS DISTRIBUTION VALVE
Edward N. Wrenshall, Ross Township, Allegheny County, Pa., assignor, by mesne assignments, to Kerotest Manufacturing Corp., Pittsburgh, Pa., a corporation of Pennsylvania
Filed Mar. 2, 1964, Ser. No. 348,450
The portion of the term of the patent subsequent to Nov. 8, 1983, has been disclaimed
U.S. Cl. 251—214      2 Claims
Int. Cl. F16k *31/50, 41/04;* F16l *21/02*

This invention relates to a valve subjected to exterior moisture, as an underground gas distribution valve, and has to do with means for sealing the valve stem to the casing which will withstand the ravages of moisture seeping in from the outside around the stem tending to penetrate or bypass the sealing means heretofore provided in such valves and reach the valve packing. When such moisture seeping in from the outside reaches the valve packing it impairs or destroys the leakproofness of the packing.

A valve of the general type to which the present invention relates is disclosed in my copending application Ser. No. 278,200, filed May 6, 1963, now Patent No. 3,284,089. That valve includes packing interposed between the valve stem and the casing with an adapter capping the packing outwardly of the casing, the adapter being provided with inner and outer O rings, the inner O ring sealing the adapter to the valve stem and the outer O ring sealing the adapter to the casing. Thus the adapter with the inner and outer O rings performs the function of sealing the valve stem to the casing.

The valve of my said copending application has proved eminently satisfactory in the use for which it was designed. The present invention is in the nature of an improvement and is for valves subjected to exterior moisture which seeps in around the valve stem and reaches the sealing means. The most satisfactory type of sealing means is the O ring which is well known in the art. For proper functioning the O ring must flex under the action of pressure to lie in intimately close relation to surfaces of the members being sealed together thereby. Anything which interferes with such flexing of the O ring destroys its sealing function.

In gas distribution systems valves are disposed underground either in passageways to which access is had through manholes as in cities or buried in the earth as in rural areas. In either case the valve is subjected to exterior moisture. In cities rain passes through the vent holes in the manhole covers and drips or seeps down onto the valve. In rural areas rain seeps down through the ground to the valve. The moisture thus coming in contact with the exterior of the valve seeps into the valve casing along the valve stem until it reaches the sealing means. The moisture may carry with it from the outside particles of dirt, oxides and other foreign matter. It may contain salt spread upon city streets in the winter to melt snow. The moisture may contain acids from mines. The moisture also reacts with the metal valve casing to produce minute iron oxide particles.

Thus the moisture entering the valve casing carries with it solid particles of varying characteristics which reach the sealing means, i.e., the O rings. Such particles will reach both the inner O ring (the O ring sealing the adapter to the valve stem) and the outer O ring (the O ring sealing the adapter to the valve casing). The solid particles collect or pack around the O rings preventing normal flexing of the O rings and hence destroying or impairing the sealing effect or leakproofness thereof. Some of the moisture may pass the O rings and reach the packing which impairs the normal function of the packing which is to prevent the leakage of gas outwardly therepast.

I have discovered how to overcome the effect of moisture seeping into the valve around the stem without greatly changing the valve structure. While my improvement seems simple once it is disclosed, it for the first time solves a long existing problem.

I reasoned that if the solid particles above referred to can be prevented from collecting and packing around the O rings which are relied upon to seal the valve and interfering with proper flexing and hence sealing of those O rings leakage can be prevented even under the most severe conditions of exposure of the valve to exterior moisture. After considerable experimentation I discovered that the solution to the problem lies in the provision of a second or protective O ring outwardly of the previously provided sealing O ring, both between the adapter and the valve stem and between the adapter and the valve casing. I find that the second or protective O ring disposed outwardly of the sealing O ring serves to collect the solid particles entering the casing around the valve stem, which solid particles pack around the protective O ring. While such solid particles prevent normal flexing of the protective O ring, which in turn results in the passage of some moisture past the protective O ring to the sealing O ring, the sealing O ring serves to effectively seal the valve and prevent moisture from passing inwardly therepast since the natural flexing of the sealing O ring is not interfered with due to the fact that the solid particles are trapped by the protective O ring. Thus the two O rings in series or tandem, both those between the valve stem and the adapter and those between the adapter and the casing, cooperate with each other in novel manner to produce a result not previously obtained, i.e., the protective O ring traps the solid particles entering with the moisture and although those solid particles impair its normal flexibility and permit some moisture to flow therepast the solid particles are prevented from reaching the sealing O ring which effectively prevents passage of any moisture reaching it because its normal flexibility is preserved due to the fact that no substantial quantity of solid particles reaches it. The result is that the inward passage of moisture to the packing is prevented and the leakproofness of the valve is maintained. The protective O ring functions in an entirely new way for an O ring, not as a seal but as a trap for solid particles.

For extremely severe moisture conditions a further improvement feature is utilized, i.e., the adapter is made of non-corrodible material, preferably stainless steel, although other non-corrodible materials such as acid-resistant plastics may be employed. The use of an adapter of non-corrodible material obviates the formation of oxide particles by the action of the incoming moisture on the adapter itself. This increases the capacity of the protective O ring to trap incoming solid particles and prevent them from passing to the sealing O ring.

I provide a valve subjected to exterior moisture, as an underground gas distribution valve, comprising a casing having inlet and outlet connections, a turnable valve stem projecting from the casing a valve element in the casing, connections between the stem and the valve element moving the valve element between open and closed positions upon turning of the stem, the casing and stem being shaped to provide an annular packing receiving chamber about the stem inwardly of the portion of the casing where the stem projects from the casing, packing in the chamber confined between the casing and the stem, an adapter ring, preferably of non-corrodible material, in the chamber outwardly of the packing, two parallel annular inner grooves in the adapter ring in communication with the stem, O rings in the respective annular inner grooves of the adapter ring engaging the valve stem, two parallel annular outer grooves in the adapter ring in communication with the casing and O rings in the respective annular outer grooves of the adapter ring engaging the casing.

Other details, objects and advantages of the invention will become apparent as the following description of a present preferred embodiment thereof proceeds.

In the accompanying drawing I have shown in central vertical cross section a valve illustrating my invention in a present preferred embodiment.

Referring now more particularly to the drawing, there is shown a valve casing designated generally by C comprising a main housing 2 through which a gas passage P extends and having inlet and outlet connections 3 and opposed inclined integral valve seats 4. The valve element is shown at 5 and is mounted for vertical movement between an operative position closing the gas passage P through tight engagement with the seats 4 as shown in the drawing and an inoperative position in which the gas passage P is open, the valve element being raised into the neck portion 6 of the housing 2 to inoperative position.

A bonnet 7 forming part of the casing C is applied to the housing 2, being fastened thereto by bolts 8, suitable sealing means 8a being provided between the housing and bonnet as is customary in the art. The bonnet has a cylindrical chamber 9 which is open at the top.

The valve element 5 is raised and lowered by means of a stem 10 which has a threaded portion 11 which is threaded into the valve element 5 so that when the stem 10 is turned in place the valve element moves axially of the stem. The stem 10 has an integral cylindrical enlargement 12 with flat top and bottom faces 12a and 12b respectively disposed of right angles to the axis of the stem 10, the enlargement 12 being disposed in the cylindrical chamber 9 of the bonnet 7. The downward thrust of the enlargement 12 when the valve element 5 is being moved outwardly or upwardly viewing the drawing is taken by the portion 13 of the bonnet having a flat upper face through a flat thrust washer 14. The bonnet has a passage 15 receiving the portion of the stem inwardly of the enlargement 12.

Packing designated generally by reference numeral 16, preferably preformed to predetermined dimensions, is disposed about the enlargement 12 of the stem 10 within the chamber 9. As the drawing shows, the casing and the valve stem are shaped to provide an annular packing receiving chamber about the stem inwardly of the portion of the casing where the stem projects from the casing. The packing 16 is confined between an outer adapter 26 and an inner adapter 27, which latter seats on a ledge 17 near the bottom of the chamber 9. The outer adapter 26 is preferably made of non-corrodible material as above stated for the purpose explained. The inner adapter 27 may also be made of non-corrodible material but that is not of prime importance in relation to the present invention. The packing 16 is flexible packing comprising a nested plurality of series of V ring packing elements 28 and 29 which are arranged alternately as shown in the drawing. The elements 29 are of elastomer while the elements 28 are of duck impregnated with elastomer. The nested V ring packing elements 28 and 29 have their V's pointing outwardly. The inner adapter 27 has its upper surface shaped to enter the V of the lower V ring flexible packing element 29. The outer adapter 26 has a V-shaped notch 32 fitting over or capping the upper V ring flexible packing element 28. The adapter is in the form of a ring and has two parallel annular inner grooves 33 and 34 in communication with the valve stem with O rings 35 and 36 in the respective grooves 33 and 34 engaging the valve stem. The adapter has two parallel annular outer grooves 37 and 38 in communication with the casing wtih O rings 39 and 40 in the respective grooves 37 and 38 engaging the casing. The O rings are of elastomer as in conventional in the art. Their function and cooperative relationship whereby new and useful results are accomplished are explained above. The O rings 36 and 40 are the protective O rings and the O rings 35 and 38 are the sealing O rings.

A thrust collar 18 is applied to the bonnet 7 and fastened in place by bolts 19. The thrust collar 18 has a flat annular downwardly facing abutment portion 18a which through a flat thrust washer 20 absorbs the upward thrust of the enlargement 12 when the valve element is being moved downwardly from inoperative to operative position in the housing 2 and seated against the opposed valve seats 4 to close the gas passage P.

Integral with the thrust collor 18 is an annular packing gland 21 which enters the chamber and surrounds the outer end of the enlargement 12, fitting between the outer end of the enlargement 12 and the outer end of the chamber 9, and engages the outer face 22 of the outer adapter 26. Since downward movement of the combination thrust collar and packing gland is positively limited by the bonnet 7 the distance to which the packing gland 21 may enter the annual space between the outer periphery of the upper portion of the enlargement 12 and the inner periphery of the upper portion of the chamber 9 is positively limited so that it is impossible to impose on the packing any pressure in excess of the design pressure. The outer extremity 23 of the end of the valve stem 10 projecting out of the casing is of non-circular cross section and has applied thereto an exteriorly non-circular wrench receiving portion or hub 24 held in place by a nut 25. Thus the non-circular wrench receiving portion or hub 24 is operatively integral with the stem 10. A wrench with jaws adapted to fit the hub 24 is used to turn the stem 10 to move the valve element 5. My invention is adaptable to any valve having a valve element moved between open and closed positions upon turning of the stem including plug valves and rising stem valves.

While I have shown and described a present preferred embodiment of the invention it is to be distinctly understood that the invention is not limited thereto but may be otherwise variously embodied within the scope of the following claims.

I claim:

1. A valve subjected to exterior moisture, as an underground gas distribution valve, comprising a casing having inlet and outlet connections, a turnable valve stem projecting from the casing, a valve element in the casing, connections between the stem and the valve element moving the valve element between open and closed positions upon turning of the stem, the casing and stem being shaped to provide an annular packing receiving chamber about the stem inwardly of the portion of the casing where the stem projects from the casing, packing in the chamber a thrust collar confining said packing between the casing and the stem, an adapter ring in the chamber outwardly of the packing, two parallel spaced annular inner grooves in the adapter ring in communication with the stem, O rings positioned in the respective spaced annular inner grooves of the adapter ring and engaging the valve stem, two parallel spaced annular outer grooves in the adapter ring in communication with the casing and O rings positioned in the respective spaced annular outer grooves of the adapter ring and engaging the casing, the O rings positioned in the inner and outer grooves remote from the packing and adjacent said thrust collar serving to collect solid particles entering the receiving chamber between said thrust collar, said stem and said casing, which solid particles pack around said last named O rings, preventing passage of solid particles to the O rings in the inner and outer grooves adjacent to the packing and enabling said last mentioned O rings to be fully effective in inhibiting leakage of fluid therepast.

2. A valve subjected to exterior moisture, as an underground gas distribution valve, comprising a casing having inlet and outlet connections, a turnable valve stem projecting from the casing, a valve element in the casing, connections between the stem and the valve element moving the valve element between open and closed positions upon turning of the stem, the casing and stem being shaped to provide an annular packing receiving chamber about the stem inwardly of the portion of the casing where the stem projects from the casing, packing in the chamber a thrust collar confining said packing between the casing and the stem, said thrust collar abutting an adapter ring of non-corrodible material positioned in the chamber outwardly of the packing, two parallel spaced annular inner grooves in the adapter ring in communication with the stem, O rings positioned in the respective spaced annular inner grooves of the adapter ring and engaging the valve stem, two parallel spaced annular outer grooves in the adapter ring in communication with the casing and O rings positioned in the respective spaced annular outer grooves of the adapter ring and engaging the casing, the O rings positioned in the inner and outer grooves remote from the packing and adjacent said thrust collar serving to collect solid particles entering the receiving chamber between said thrust collar, said stem and said casing, which solid particles pack around said last named O rings, preventing passage of solid particles to the O rings in the inner and outer grooves adjacent to the packing and enabling said last mentioned O rings to be fully effective in inhibiting leakage of fluid therepast.

References Cited

UNITED STATES PATENTS

| | | | |
|---|---|---|---|
| 2,214,261 | 9/1940 | Roth | 277—58 |
| 2,417,828 | 3/1947 | Joy | 277—188 |
| 2,595,592 | 5/1952 | Magnuson | 277—59 |
| 2,654,395 | 10/1953 | Kaye | 251—368 |
| 2,876,987 | 3/1959 | Renfro | 251—214 |
| 3,204,970 | 9/1965 | Dickinson | 251—214 |
| 2,479,711 | 8/1949 | Arutunoff | 277—37 |
| 3,186,724 | 6/1965 | Wheatley | 277—187 X |
| 3,284,089 | 11/1966 | Wrenshall | 277—125 |

FOREIGN PATENTS 647,436  8/1962  Canada.

ALAN COHAN, *Primary Examiner.*

D. R. MATTHEWS, *Assistant Examiner.*

U.S. Cl. X.R.

277—58, 105, 188